United States Patent
Hamada

(10) Patent No.: US 7,646,714 B2
(45) Date of Patent: Jan. 12, 2010

(54) PROGRAM, METHOD AND APPARATUS FOR FORM OUTPUT

(75) Inventor: Yukihiro Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 709 days.

(21) Appl. No.: 11/200,195

(22) Filed: Aug. 10, 2005

(65) Prior Publication Data

US 2006/0224787 A1 Oct. 5, 2006

(30) Foreign Application Priority Data

Mar. 30, 2005 (JP) ............................. 2005-097457

(51) Int. Cl.
*G01R 31/08* (2006.01)
(52) U.S. Cl. ..................... 370/232; 370/412; 710/52
(58) Field of Classification Search .................. 710/52; 370/232, 412
See application file for complete search history.

(56) References Cited

U.S. PATENT DOCUMENTS

| 4,646,290 | A | * | 2/1987 | Hills | ......................... 370/345 |
|---|---|---|---|---|---|
| 5,165,021 | A | * | 11/1992 | Wu et al. | ..................... 709/234 |
| 5,790,522 | A | * | 8/1998 | Fichou et al. | ................ 370/236 |
| 6,385,673 | B1 | * | 5/2002 | DeMoney | ..................... 710/60 |
| 6,963,577 | B1 | * | 11/2005 | Tomonaga et al. | .......... 370/412 |

FOREIGN PATENT DOCUMENTS

JP 04092964 3/1992

* cited by examiner

*Primary Examiner*—Kevin C Harper
*Assistant Examiner*—Sai-Ming Chan
(74) *Attorney, Agent, or Firm*—Staas & Halsey LLP

(57) ABSTRACT

Queues are provided, which are a high-speed small-capacity queue disposed in a high-speed small-capacity medium inputting and outputting online form messages at high speed and a low-speed large-capacity queue disposed in a low-speed large-capacity medium inputting and outputting batch form messages at a speed slower than the high-speed small-capacity medium. A residence rate detection unit detects a residence rate of the form messages in the high-speed small-capacity queue. When the form message is received, a storage control unit stores the form message into the high-speed small-capacity queue or the low-speed large-capacity queue determined based on the priority, the availability of the high-speed small-capacity medium and the residence rate. A dynamic allocation change unit transfers the form messages between the queues based on the residence rate of the high-speed small-capacity queue 30-1 and the availability of the high-speed small-capacity medium.

16 Claims, 14 Drawing Sheets

FIG. 4

| PRIORITY | AVAILABILITY OF HIGH-SPEED SMALL-CAPACITY MEDIUM | RESIDENCE RATE | STORAGE LOCATION |
|---|---|---|---|
| HIGH (ONLINE MESSAGE) | AVAILABLE | | HIGH-SPEED SMALL-CAPACITY QUEUE |
| | NOT AVAILABLE | | LOW-SPEED LARGE-CAPACITY QUEUE |
| LOW (BATCH MESSAGE) | HIGH (20% OR MORE) | SLOW | HIGH-SPEED SMALL-CAPACITY QUEUE |
| | | FAST | LOW-SPEED LARGE-CAPACITY QUEUE |
| | LOW (LESS THAN 20%) | | LOW-SPEED LARGE-CAPACITY QUEUE |

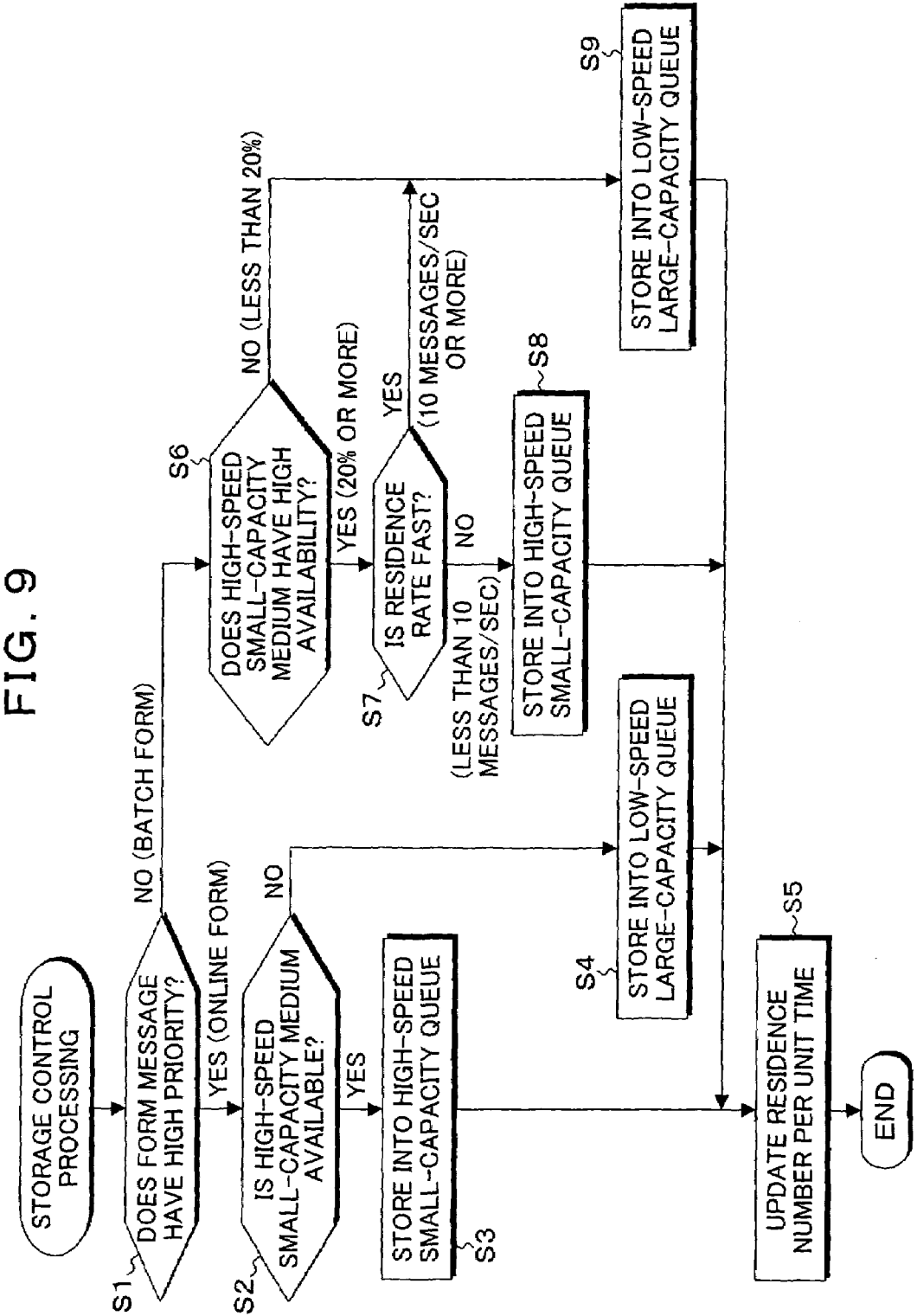

FIG. 10

| RESIDENCE RATE | AVAILABILITY OF HIGH-SPEED SMALL-CAPACITY MEDIUM | TRANSFER OF FORM MESSAGE |
|---|---|---|
| FAST (10 MESSAGES/SEC OR MORE) | SUFFICIENT (20% OR MORE) | NOT TRANSFERRED |
| | INSUFFICIENT (LESS THAN 20%) | FORM MESSAGES WITH LOW PRIORITY ARE TRANSFERRED FROM HIGH-SPEED SMALL-CAPACITY QUEUE TO LOW-SPEED LARGE-CAPACITY QUEUE |
| SLOW (LESS THAN 10 MESSAGES/SEC) | SUFFICIENT (20% OR MORE) | FORM MESSAGES ARE TRANSFERRED IN ORDER OF PRIORITY FROM LOW-SPEED LARGE-CAPACITY QUEUE TO HIGH-SPEED SMALL-CAPACITY QUEUE |
| | SUFFICIENT (LESS THAN 20%) | NOT TRANSFERRED |

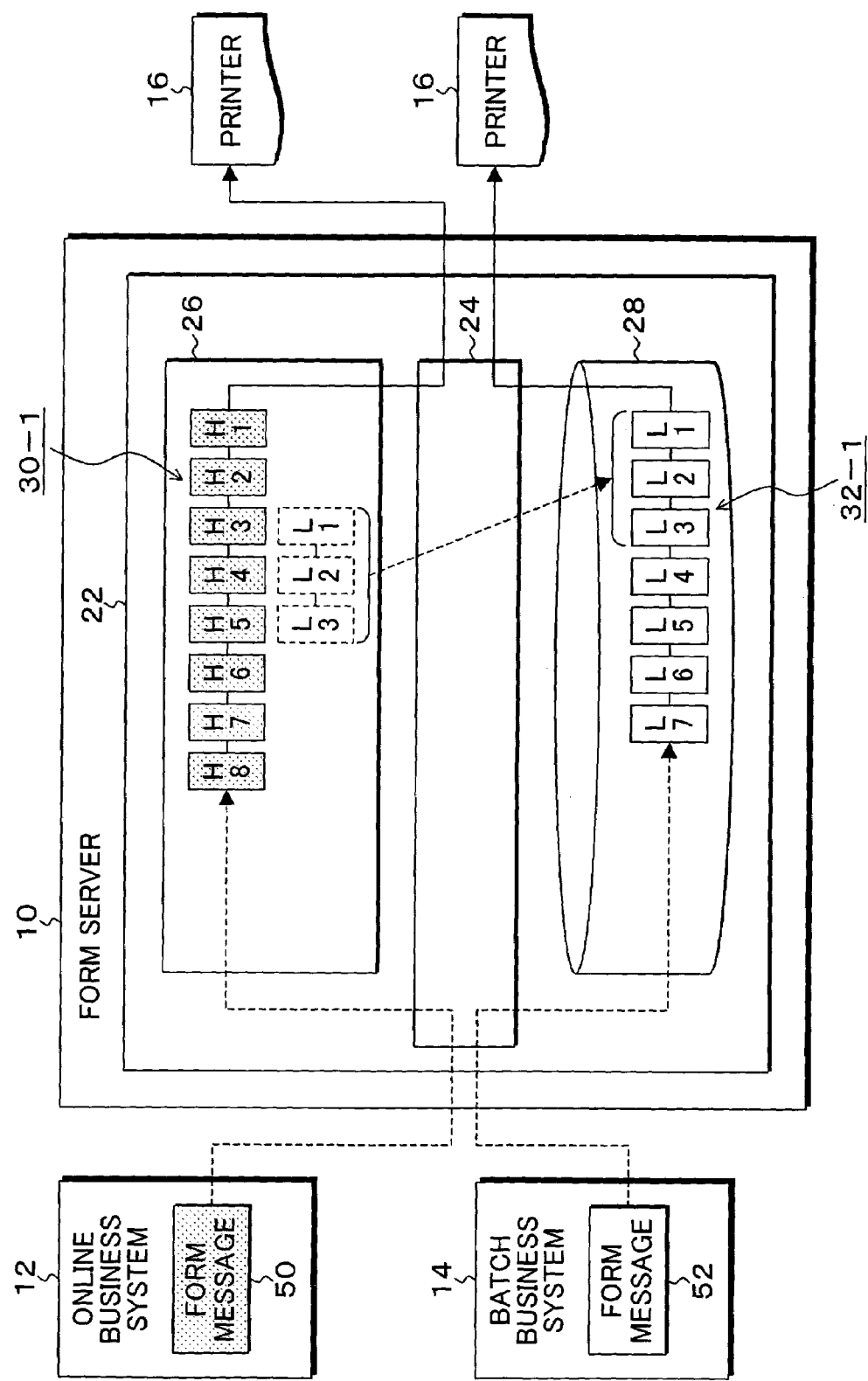

PROGRAM, METHOD AND APPARATUS FOR FORM OUTPUT

CROSS-REFERENCE TO RELATED APPLICATION

This application claims the benefit of priority to prior application No. JP2005-097457, filed Mar. 30, 2005 in Japan, of which full contents are incorporated herein by reference.

BACKGROUND OF THE INVENTION

1. Field of the Invention

The present invention relates generally to a program, and a form output method and apparatus for outputting form messages processed by an application to predetermined devices after storing the form messages into queues and, more particularly, to a program, and a form output method and apparatus for outputting online-processed or batch-processed form messages to predetermined devices after storing the form messages into queues at the same output destination.

2. Description of the Related Art

Conventionally, in a form output server, a queue is arranged for each output destination such as a printer, FAX or electric medium, and after form messages are output from an application for business processing and the like and are stored into the queues, the form messages are retrieved and transferred from the queues in accordance with processing situations of the output destinations. If the queue is arranged for each output destination of the form, in consideration of requirements such as a maximum residence amount of the queues and acceptable time period until output of the forms, the queue is allocated to a separate storage media for each business operation in advance. If one (1) queue is shared by multiple applications, for example, if the queue is shared by an online business application and a batch business application, the storage medium for allocating the queue is selected in conformity to form output processing with the most rigid conditions.

However, in such a conventional form output server, when queuing and outputting are performed for form messages from multiple applications with widely different acceptable time period and maximum residence amount of the form messages, especially, when queuing and outputting are performed for form messages from a backbone system where online processing and batch processing are mixed, if the batch processing is operated in parallel with the online processing, the output amount of the form message is temporarily increased, resulting in a problem of great fluctuations of the form output amount. In this case, in consideration of the risk, a queue is usually allocated to a medium with a large capacity but low speed. However, although this can accommodate the fluctuations of the form output amount in the case that the batch processing is operated, it is problematic that output performance cannot be increased for the forms from the online business.

SUMMARY OF THE INVENTION

According to the present invention there are provided a program, and a form output method and apparatus which enable high-performance stable form output in a system where the online processing and the batch processing are mixed.

The present invention provides a program to be executed a computer of a form output apparatus. The program of the present invention is operable to drive a computer of a form output apparatus having a high-speed small-capacity queue disposed in a high-speed small-capacity medium inputting and outputting form messages at high speed and a low-speed large-capacity queue disposed in a low-speed large-capacity medium inputting and outputting form messages at a speed slower than the high-speed small-capacity medium, the form output apparatus configured to output form messages with different priorities to a predetermined device after queuing of the form messages, to execute:

a rate detection step of detecting a residence rate of form messages in the high-speed small-capacity queue;

a storage control step of, when a form message is received, storing the message into the high-speed small-capacity queue or the low-speed large-capacity queue that is determined based on the priority, the availability of the high-speed small-capacity medium and the residence rate;

a dynamic location change step of transferring the form messages between the high-speed small-capacity queue and the low-speed large-capacity queue based on the availability of the high-speed small-capacity medium and the residence rate; and an output control step of outputting the form message to the predetermined device from the high-speed small-capacity queue and/or the low-speed large-capacity queue depending on the priority.

The storage control step comprises:

a first storage control step of, when a high-priority form message is received, storing the message into the high-speed small-capacity queue if the high-speed small-capacity medium is available and storing the message into the low-speed large-capacity queue if the high-speed small-capacity medium is not available; and a second storage control step of, when a low-priority form message is received, storing the message into the high-speed small-capacity queue if the availability of the high-speed small-capacity medium is sufficient, storing the message into the low-speed large-capacity queue if the residence rate is fast, and storing the message into the low-speed large-capacity queue if the availability of the high-speed small-capacity medium is insufficient.

The dynamic location change step includes:

periodically determining the residence rate of the high-speed small-capacity queue;

if the residence rate is fast, transferring the low-priority form messages from the high-speed small-capacity queue to the low-speed large-capacity queue when the availability of the high-speed small-capacity medium is insufficient; and if the residence rate is slow, transferring the high-priority and low-priority form messages from the low-speed large-capacity queue to the high-speed small-capacity queue when the availability of the high-speed small-capacity medium is sufficient.

The dynamic location change step includes, when the residence rate is slow and the availability of the high-speed small-capacity medium is sufficient, transferring the low-priority messages from the low-speed large-capacity queue to the high-speed small-capacity queue after transferring the high-priority messages from the low-speed large-capacity queue to the high-speed small-capacity queue. The high-speed small-capacity queue is a semiconductor memory and the low-speed large-capacity queue is a disk device. The rate detection step includes detecting and recording the residence number of the form messages stored in the high-speed small-capacity queue at predetermined time intervals to detect the residence rate from a difference between the residence numbers at a start time and an end time of a certain recording period. The rate detection step includes, if the maximum value and the minimum value exist outside of the range between the residence numbers at the start time and the end time within the certain recording period, adding an absolute value of the difference between the maximum value and the minimum value to the residence rate. The set of the high-speed small-capacity queue and the low-speed large-capacity queue is constructed for each device which is an output destination of form messages. The second storage control step includes determining that the availability is sufficient if the available capacity of the high-speed small-capacity medium is equal to or more than a threshold value and that the availability is insufficient if less than the threshold value. The threshold value of the available capacity is at least 20 percent. The second storage control step includes determining that a rate is fast if the rate is equal to or greater than a transferring rate of the form messages from the high-speed small-capacity medium to the low-speed large-capacity medium and that a rate is slow if the rate is less than the transferring rate.

The present invention provides a form output method. The form output method of the present invention is adapted to have a high-speed small-capacity queue disposed in a high-speed small-capacity medium inputting and outputting form messages at high speed and a low-speed large-capacity queue disposed in a low-speed large-capacity medium inputting and outputting form messages at a speed slower than the high-speed small-capacity medium, to output form messages with different priorities to a predetermined device after queuing of the form messages, the method comprising:

a rate detection step of detecting a residence rate of form messages in the high-speed small-capacity queue;

a storage control step of, when the form message is received, storing the message into the high-speed small-capacity queue or the low-speed large-capacity queue that is determined based on the priority, the availability of the high-speed small-capacity medium and the residence rate;

a dynamic location change step of transferring the form messages between the high-speed small-capacity queue and the low-speed large-capacity queue based on the availability of the high-speed small-capacity medium and the residence rate; and an output control step of outputting the form message to the predetermined device from the high-speed small-capacity queue and/or the low-speed large-capacity queue depending on the priority.

The present invention provides a form output apparatus. The form output apparatus of the present invention is configured to output form messages with different priorities to a predetermined device after queuing of the form messages, the apparatus comprising:

a high-speed small-capacity queue disposed in a high-speed small-capacity medium inputting and outputting form messages at high speed;

a low-speed large-capacity queue disposed in a low-speed large-capacity medium inputting and outputting form messages at a speed slower than the high-speed small-capacity medium;

a rate detection unit detecting a residence rate of form messages in the high-speed small-capacity queue;

a storage control unit, when a form message is received, storing the message into the high-speed small-capacity queue or the low-speed large-capacity queue that is determined based on the priority, the availability of the high-speed small-capacity medium and the residence rate;

a dynamic location change unit transferring the form messages between the high-speed small-capacity queue and the low-speed large-capacity queue based on the availability of the high-speed small-capacity medium and the residence rate; and an output control unit outputting the form message to the predetermined device from the high-speed small-capacity queue and/or the low-speed large-capacity queue depending on the priority.

The details of the form output method and apparatus according to the present invention will become substantially the same as those of the program of the present invention.

According to the present invention, a high-speed small-capacity medium and a low-speed large-capacity medium are prepared as a location for one (1) queue, and while determining availability of the media and a residence rate of form messages in real time, queuing into a high-speed small-capacity queue is performed for the form messages with high priority from online processing which needs a short acceptable output time period as far as possible and, on the other hand, queuing into a low-speed small-capacity queue is performed for the form messages with low priority from batch processing unless the high-speed small-capacity queue has sufficient availability. Therefore, if a batch operation is performed during online and an output amount of the form messages is temporarily increased, a shortage of capacity is prevented by the queuing to the low-speed large-capacity queue and, on the other hand, while the batch operation is halted, the online form output performance can be sufficiently increased by the queuing to the high-speed small-capacity queue. Also, optimization of the queuing status is planed for dynamically corresponding to variations of processing situations after the queuing of the form messages by periodically monitoring the processing situations of the form messages in the high-speed small-capacity queue after performing the queuing, by transferring the low-priority form messages from the high-speed small-capacity queue to the low-speed large-capacity queue if a residence rate of the form messages is fast and by transferring the form messages from the low-speed large-capacity queue to the high-speed small-capacity queue regardless of the priority if the residence rate of the form messages is slow. As a result, if one (1) queue is shared by multiple applications mixing online processing and batch processing and the like, high-performance stable form output operations can be established.

The above and other objects, features and advantages of the present invention will become more apparent from the following detailed description with reference to the drawings.

BRIEF DESCRIPTION OF THE DRAWINGS

FIG. 4 is an explanatory view of a control table of a storage control unit of FIG. 1;

FIG. 9 is a flowchart of control processing by the storage control unit of FIG. 1;

FIG. 10 is an explanatory view of a control table of a dynamic allocation change unit of FIG. 1;

FIG. 11 is an explanatory view of location change processing in the case that the residence rate is fast and the high-speed small-capacity queue has insufficient availability;

DETAILED DESCRIPTION OF THE PREFERRED EMBODIMENTS

Figure 1:
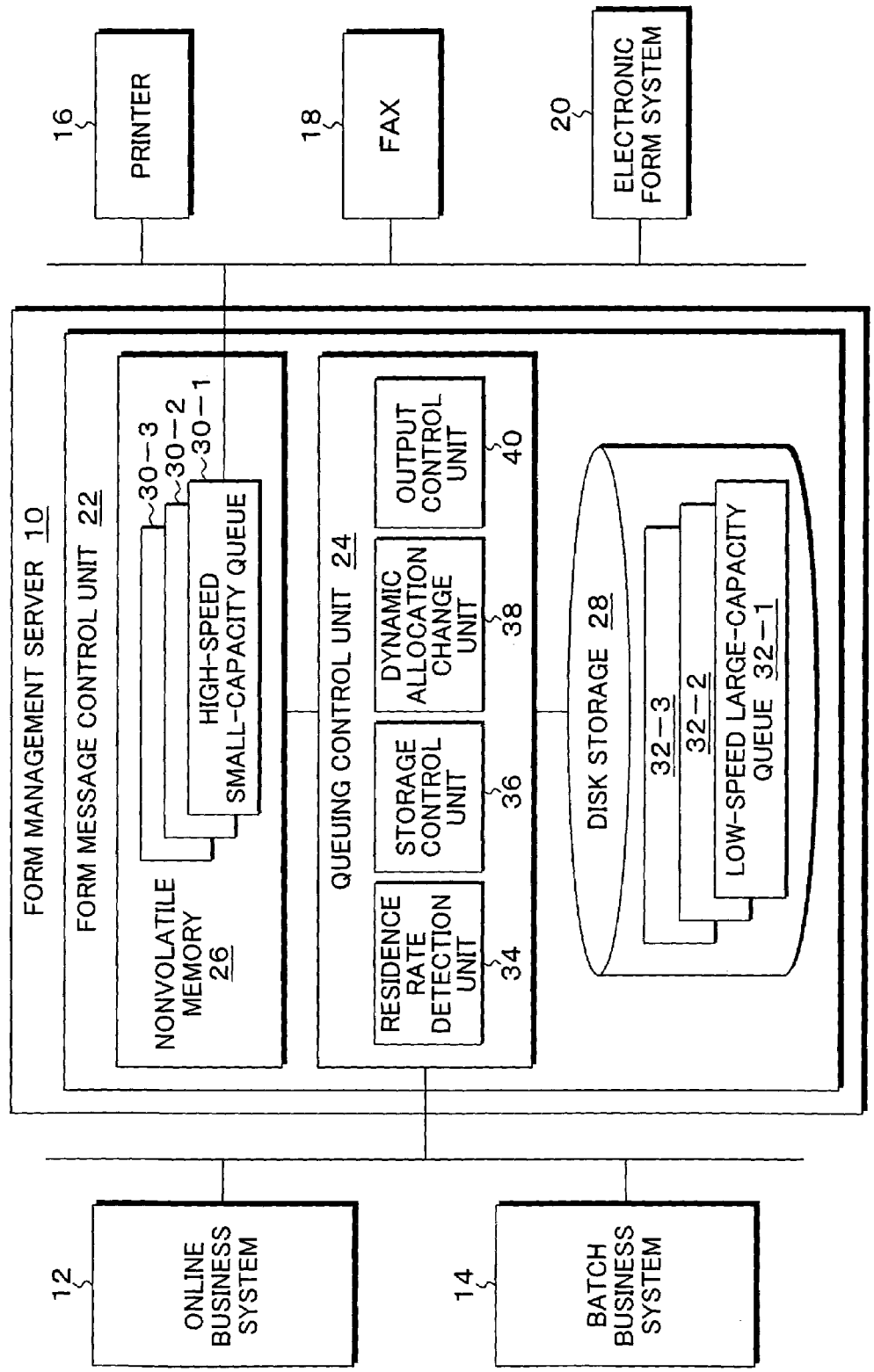
FIG. 1 is a block diagram of a functional structure of a form management server according to the present invention.

FIG. 1 is a block diagram of a functional structure of a form management server according to the present invention. In FIG. 1, the form management server 10 of the present invention stores high-priority form messages output from an online business system 12 and low-priority form messages output from a batch business system 14 into a queue provided corresponding to each of output destinations which are a printer 16, FAX 16 and an electronic form system 20 before outputting. The online business system 12 and the batch business system 14 is constructed by global servers and open servers, and the form messages from the online business system 12 need a performance assurance for outputting the forms such that time required between inputting to and outputting from the form management server 10 will be a predetermined short period of time. Contrary to this, the form messages from the batch business system 14 are form messages output intensively in a time of day, for example, in nighttime, and since acceptable time period before outputting in the form management server 10 may be relatively long, the performance for outputting the forms may be low. The form management server 10 is provided with a form message control unit 22, and according to the present invention, the form message control unit 22 is provided with a queuing control unit 24, a nonvolatile memory 26 as a high-speed small-capacity medium, and a disk storage 28 as a low-speed large-capacity medium. The queuing control unit 24 is provided with a residence rate detection unit 34, a storage control unit 36, a dynamic allocation change unit 38 and an output control unit 40. To the nonvolatile memory 26, three (3) high-speed small-capacity queues 30-1, 30-2, 30-3 are allocated corresponding to output destinations which are the printer 16, FAX 18 and electronic form system 20. The high-speed small-capacity queues 30-1 to 30-3 have dynamic lengths of queues and the form messages can be queued as long as the nonvolatile memory 26 is available. Also, to the disk storage 28, low-speed large-capacity queues 32-1, 32-2, 32-3 are allocated corresponding to the printer 16, FAX 18 and electronic form system 20. The low-speed large-capacity queues 32-1 also have dynamically variable queue lengths and the form messages can be stored as long as the disk storage 28 is available. One (1) logical queue is consisted of a pair of a queue storing the high-priority form messages and a queue storing the low-priority form messages, which have the same output destinations. For example, One (1) logical queue is consisted of a pair of the high-speed small-capacity queue 30-1 storing the high-priority form messages and the low-speed large-capacity queues 32-1 storing the low-priority form messages, which have output destinations as the printer 16. The high-speed small-capacity medium or the low-speed large-capacity medium may be provided with the queue storing the high-priority form messages and the queue storing the low-priority form messages, and also in this case, one (1) logical queue is consisted of a pair of queues.

Figure 2:
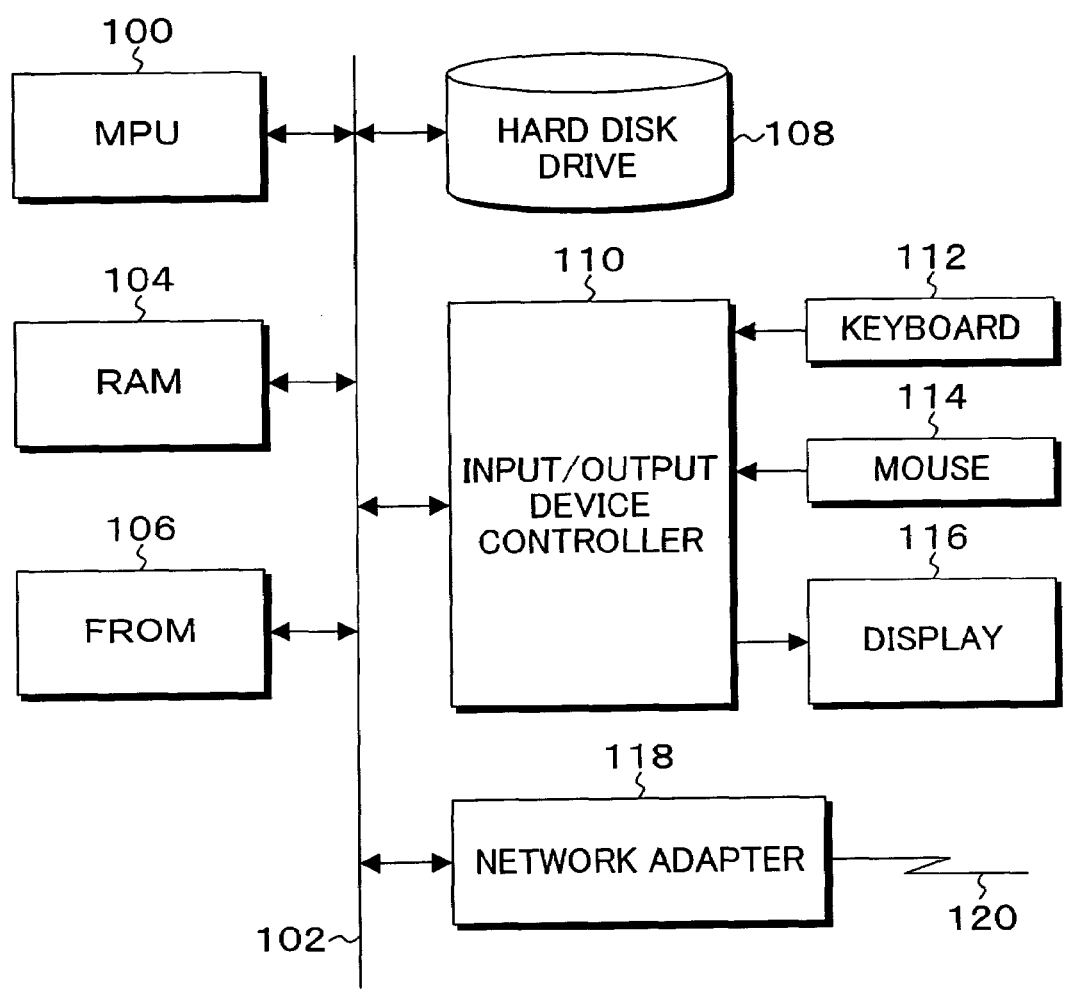
FIG. 2 is an explanatory view of hardware environment of a computer to which the server of FIG. 1 is applied.

The form management server 10 of FIG. 1 is realized by, for example, hardware environment of a computer as shown in FIG. 2. In the computer of FIG. 2, a bus 102 of an MPU 100 is provided with an RAM 104, a FROM 106, a hard disk drive 108, an input/output device controller comprising a keyboard 112, a mouse 114 and a display 116, and a network adapter 118 connected to network such as LAN 120. The hard disk drive 108 is loaded with a program performing the queuing control of the present invention and the necessary program is called out from the hard disk drive 108 when the computer is booted, deployed on the RAM 104 and executed by the MPU 100. As the nonvolatile memory 26 of FIG. 1, for example, the FROM 106 is used, and as the disk storage 28, the hard disk drive 108 is used. Input/output, i.e., writing/reading speed of the form messages to/from the FROM 106 is sufficiently fast relative to writing to/reading from the hard disk drive 108.

Referring again to FIG. 1, the residence rate detection unit 34 detects a residence rate for each of high-speed small-capacity queues 30-1 to 30-3 provided on the nonvolatile memory 26. The residence rate is detected in principle by detecting and recording residence numbers of the form messages stored in the high-speed small-capacity queues 30-1 to 30-3 at predetermined time intervals to detect a difference between the residence numbers at a start time and an end time of a certain recording period. When the form message is received from the online business system 12 or the batch business system 14, the storage control unit 36 stores the form message into the high-speed small-capacity queue or the low-speed large-capacity queue, which is the storage destination determined based on the priority of the form message, availability of the nonvolatile memory 26 which is the high-speed small-capacity medium, and the residence rate detected by the residence rate detection unit 34. After the form messages are queued by the storage control unit 36, the dynamic allocation change unit 38 executes processing for dynamically transferring the form messages between the high-speed small-capacity queues 30-1 to 30-3 and the low-speed large-capacity queues 32-1 to 32-3 based on the availability of the nonvolatile memory 26 which is the high-speed small-capacity medium, and the residence rate. The output control unit 40 outputs the form messages stored in the high-speed small-capacity queues 30-1 to 30-3 and/or the low-speed large-capacity queues 32-1 to 32-3 to respective output destinations which are the printer 16, the FAX 18 and the electronic form system 20 in accordance with the first-in first-out control methodology. The output control unit 40 preferentially outputs from the queue storing the high-priority form messages and, therefore, the low-priority form messages are output by utilizing vacant times when the high-priority form messages are not output.

Figure 3A:
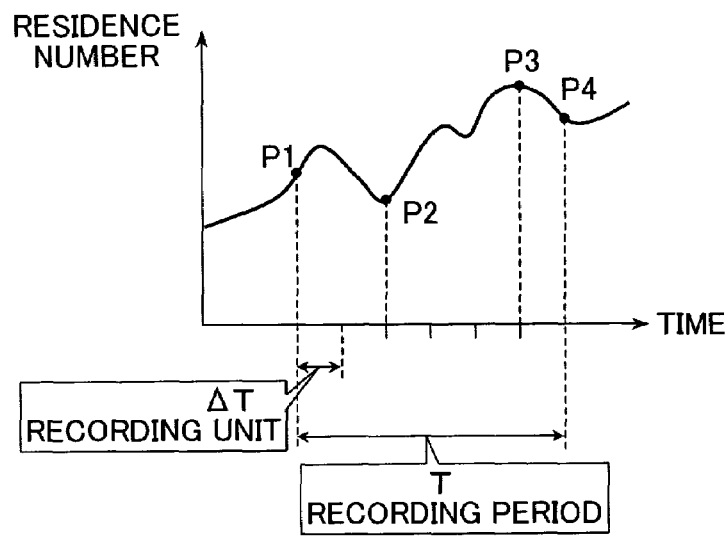
FIGS. 3A to 3C are explanatory views of a residence rate of FIG. 1.
Figure 3B:
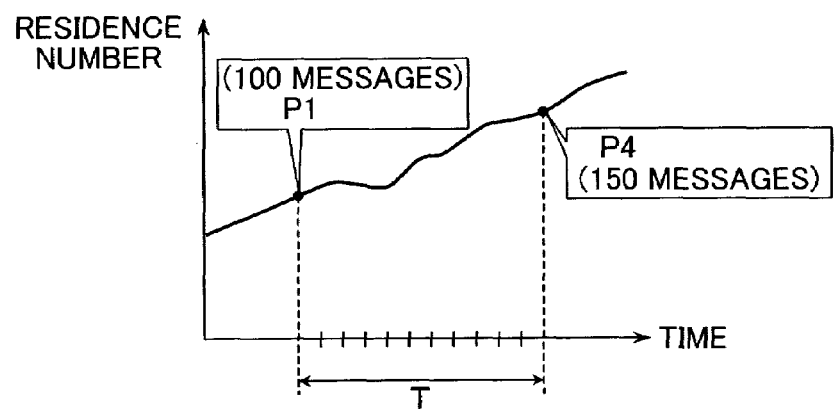
Figure 3C:
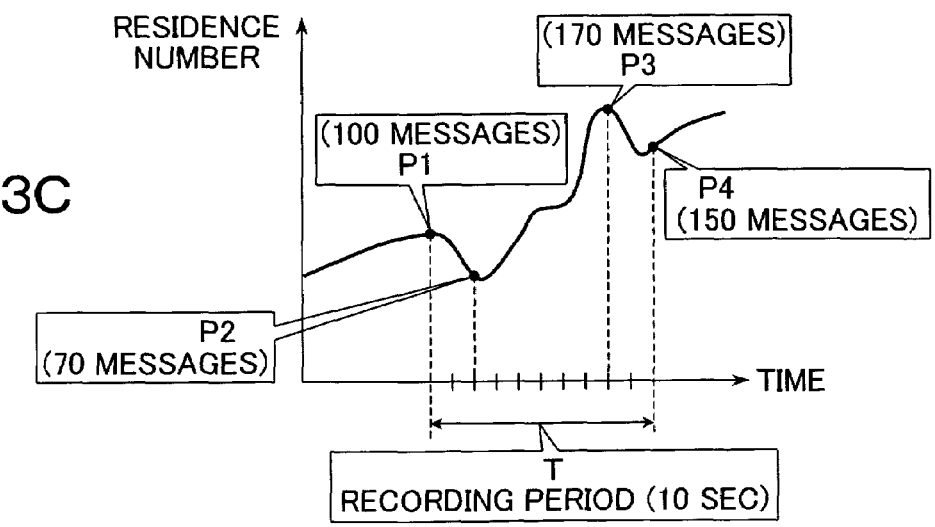

FIGS. 3A to 3C are explanatory views of the residence rate detected by the residence rate detection unit 34 of FIG. 1. In FIG. 3A, for detecting the residence rate, a residence number P of the target high-speed small-capacity queue is recorded for each predetermined recording unit $\Delta T$, for example, $\Delta T$=one (1) second. For such a record of the residence umber P for each recording unit $\Delta T$, in a certain recording period T, for example, T=10 seconds, assuming that P1 is the residence number at the starting point of the recording period T and P4 is the residence number at the end point, the residence rate can be detected as follows:

(residence rate $V$)=(end-point residence number $P4$–start-point residence number $P1$)

In order to reduce the risk that the high-speed small-capacity queue becomes unavailable in the recording period T, a maximum residence number P3 and a minimum residence number P2 are extracted, which are outside of the range between the start residence number P1 and the end residence number P4, to add an absolute value of a difference between these residence numbers. Therefore, the residence rate V is calculated by the following equation.

(residence rate $V$)=(end residence number $P4$)–(start residence number $P1$)+absolute value {(maximum residence number $P3$)–(minimum residence number $P2$)}

FIG. 3B is a specific example of the detection of the resistance rate of the present invention and shows variation of the residence numbers relative to time, in the case of the slow residence rate. In this case, the recording period T has the start residence number P1=100 and the end residence number P4=150 and since the minimum value less than the start residence number P1 and the maximum value greater than the end residence number P4 do not exist in the recording period T, the calculation is performed as follows:

$$\begin{aligned}\text{(residence rate } V) &= (P4 - P1 + [P3 - P2]) \\ &= 150 - 100 \\ &= 50 \text{(messages/10 seconds)} \\ &= 5 \text{(messages/sec)}\end{aligned}$$

FIG. 3C is variation of the residence numbers relative to time, in the case of the fast residence rate. In this case, the recording period T has the start residence number P1=100 and the end residence number P4=150, and the minimum residence number P2=70 and the maximum residence number P3=170 exist in the recording period T. The residence rate in this case is calculated as follows:

$$\begin{aligned}\text{(residence rate } V) &= (P4 - P1) + [P3 - P2] \\ &= 150 - 100 + 170 - 70 \\ &= 150 \text{(messages/10 seconds)} \\ &= 15 \text{(messages/sec)}\end{aligned}$$

FIG. 4 is an explanatory view of a control table for determining a storage location in the storage control unit 36 of FIG. 1. In the control table of FIG. 4, three (3) parameters are used for determining the storage location, which are a priority of the form message 42, availability of the high-speed small-capacity medium 44 and the residence rate 46, and the storage location is determined based on these parameters. In the case of the high-priority online form message, the message is stored into the high-speed small-capacity queue regardless of the residence rate 46 as long as the high-speed small-capacity medium is available. On the other hand, if the high-speed small-capacity medium is not available, the message is stored into the low-speed large-capacity queue. For the low-priority batch form message, if the availability of the high-speed small-capacity medium is high, for example, 20% or more, then it is determined whether the residence rate 46 is fast or slow, and if the rate is slow, the message is stored into the high-speed small-capacity queue. On the other hand, if the residence rate is fast, the message is stored into the low-speed large-capacity queue. Contrary to this, if the availability of the high-speed small-capacity medium is low, for example, less than 20%, then the message is always stored into the low-speed large-capacity queue regardless of the residence rate 46.

Figure 5:
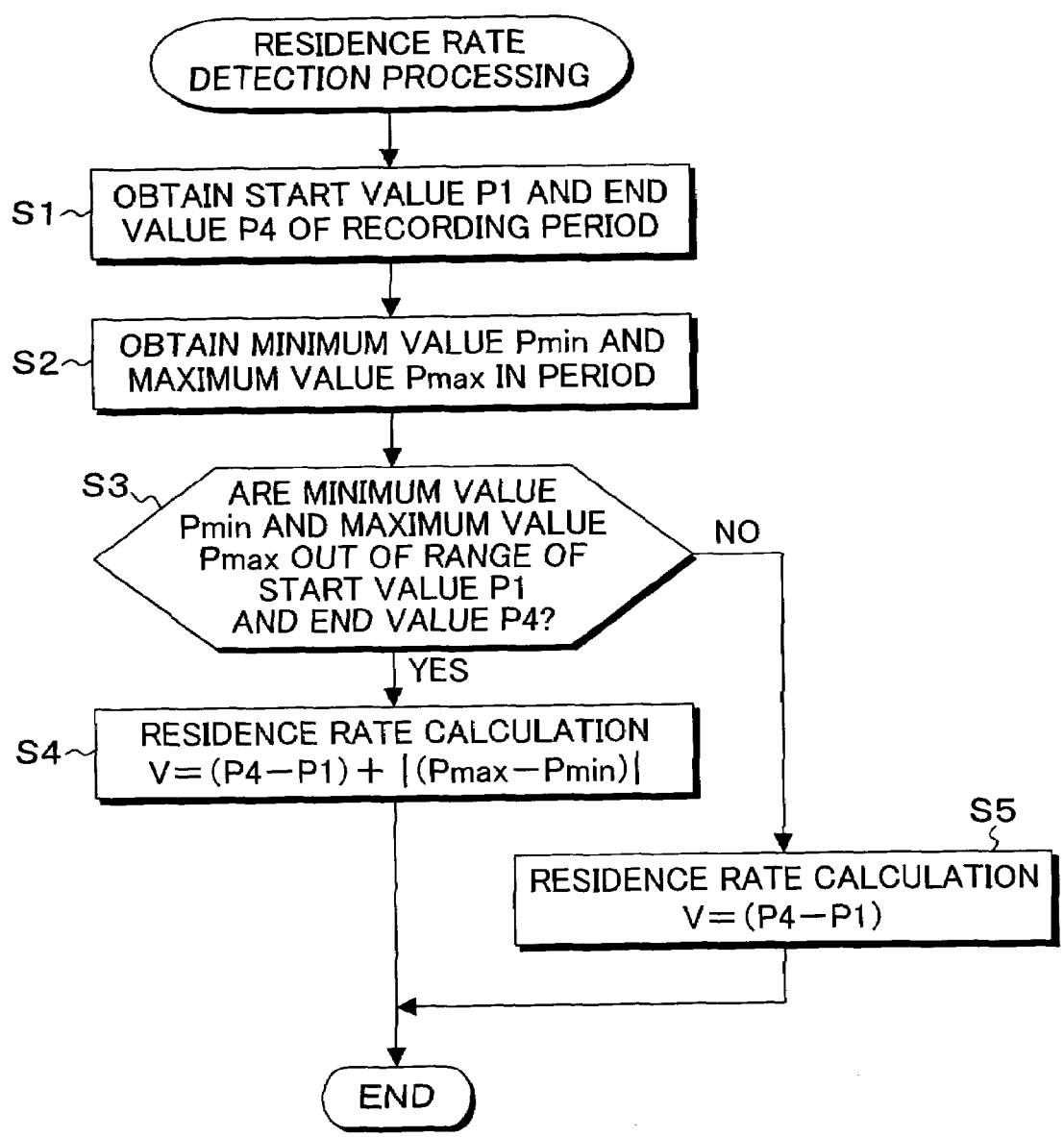
FIG. 5 is a flowchart of residence rate detection processing of FIG. 1.

FIG. 5 is a flowchart of the detection processing of the residence rate detection unit. In this residence rate detection processing, the start residence number P1 and the end residence number P4 in the recording period T are obtained in step S1, and the minimum value Pmin and the maximum value Pmax in the period are obtained in step S2. In step S3, it is checked whether the minimum value Pmin and the maximum value Pmax are within the range between the start value P1 and the end value P4 or not, and if the values are not within the range, the residence rate is calculated in step S4 by adding an absolute value of a difference between the maximum value Pmax and the minimum value Pmin to a difference between the end value P4 and the start value P1. On the other hand, if the minimum value Pmin and the maximum value Pmax are within the range between the start value P1 and the end value P4 in step S3, then the residence rate V is calculated as a difference between the end value P4 and the start value P1 in step S5.

Figure 6:
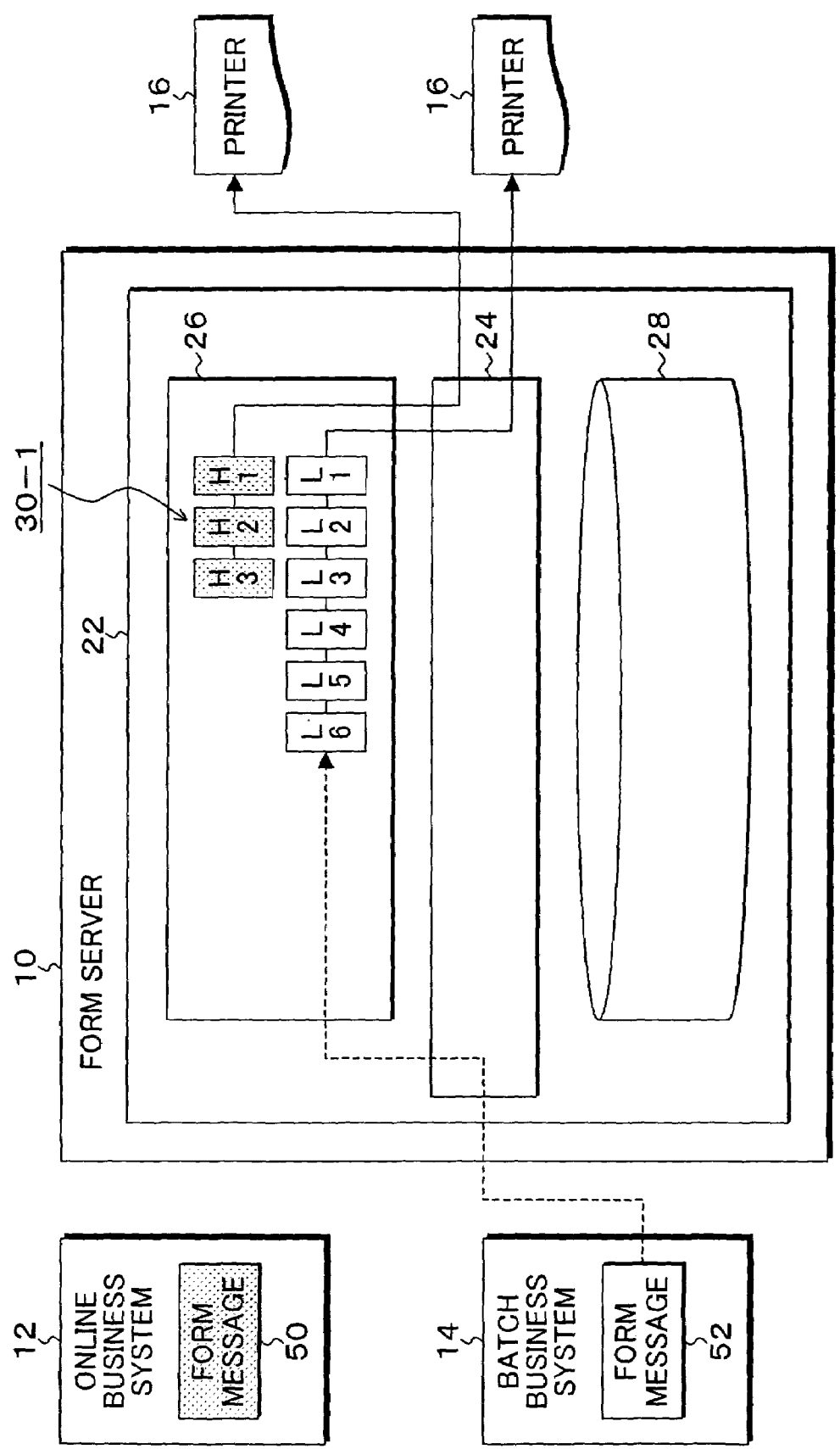
FIG. 6 is an explanatory view of storage processing in the case that a high-speed small-capacity queue has high availability and the residence rate is slow.

FIG. 6 is an explanatory view of the storage processing in the case that the nonvolatile memory 26 has high availability as the high-speed small-capacity medium and the residence rate is slow. In FIG. 6, the high-speed small-capacity queue 30-1 for the printer 16 is taken as an example, and if the availability of the high-speed small-capacity medium is high, for example 20% or more and if the residence rate is slow, for example, five (5) messages/sec or less, the low-priority form message 52 from the batch business system 14 is stored into the high-speed small-capacity queue 30-1, as revealed by the control table of FIG. 5. In this example, stores the high-priority form messages H1 to H3 from the online business system 12 are stored into the high-speed small-capacity queue 30-1 from the leading side, and then the low-priority form messages L1 to L6 from the batch business system 14 are stored as pairs.

Figure 7:
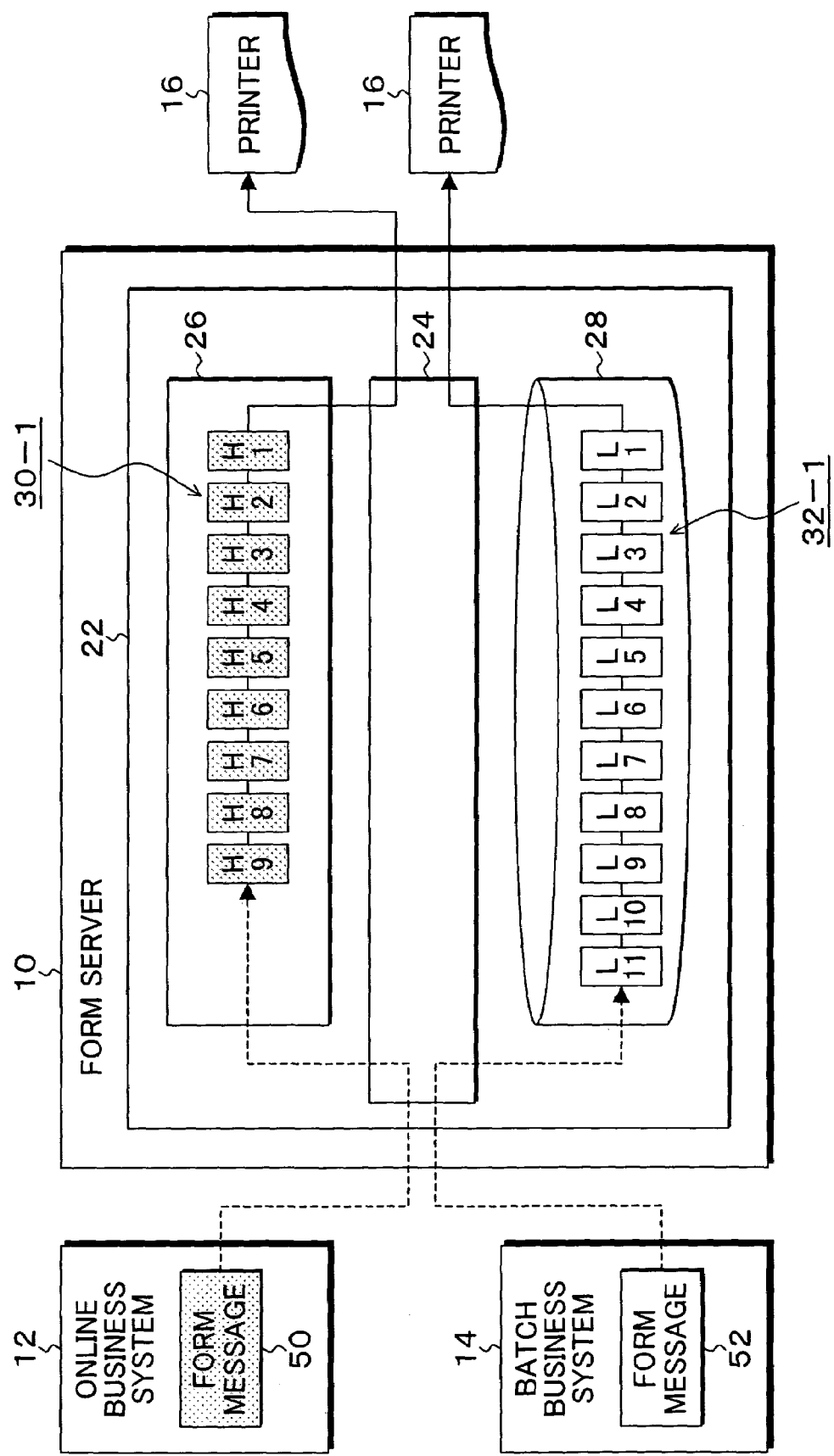
FIG. 7 is an explanatory view of storage processing in the case that the high-speed small-capacity queue has high availability and the residence rate is fast.

FIG. 7 is an explanatory view of the storage processing in the case that the high-speed small-capacity medium has high availability and the residence rate is fast, contrary to the case of FIG. 6. In this case, as revealed by the control table of FIG. 5, the high-priority form message 50 from the online business system 12 is stored into the high-speed small-capacity queue 30-1 as long as the high-speed small-capacity medium is available. On the other hand, the low-priority form message 52 from the batch business system 14 is stored into the low-speed large-capacity queue 32-1 of the disk storage 28, since the residence rate is fast. In the storage status of FIG. 7, the high-speed small-capacity queue 30-1 stores the high-priority form messages H1 to H9 output from the online business system 12 which have an output destination as the printer 16 and, on the other hand, the low-speed large-capacity queue 32-1 of the disk storage 28 stores the low-priority form messages L1 to L11 output from the batch business system 14.

Figure 8:
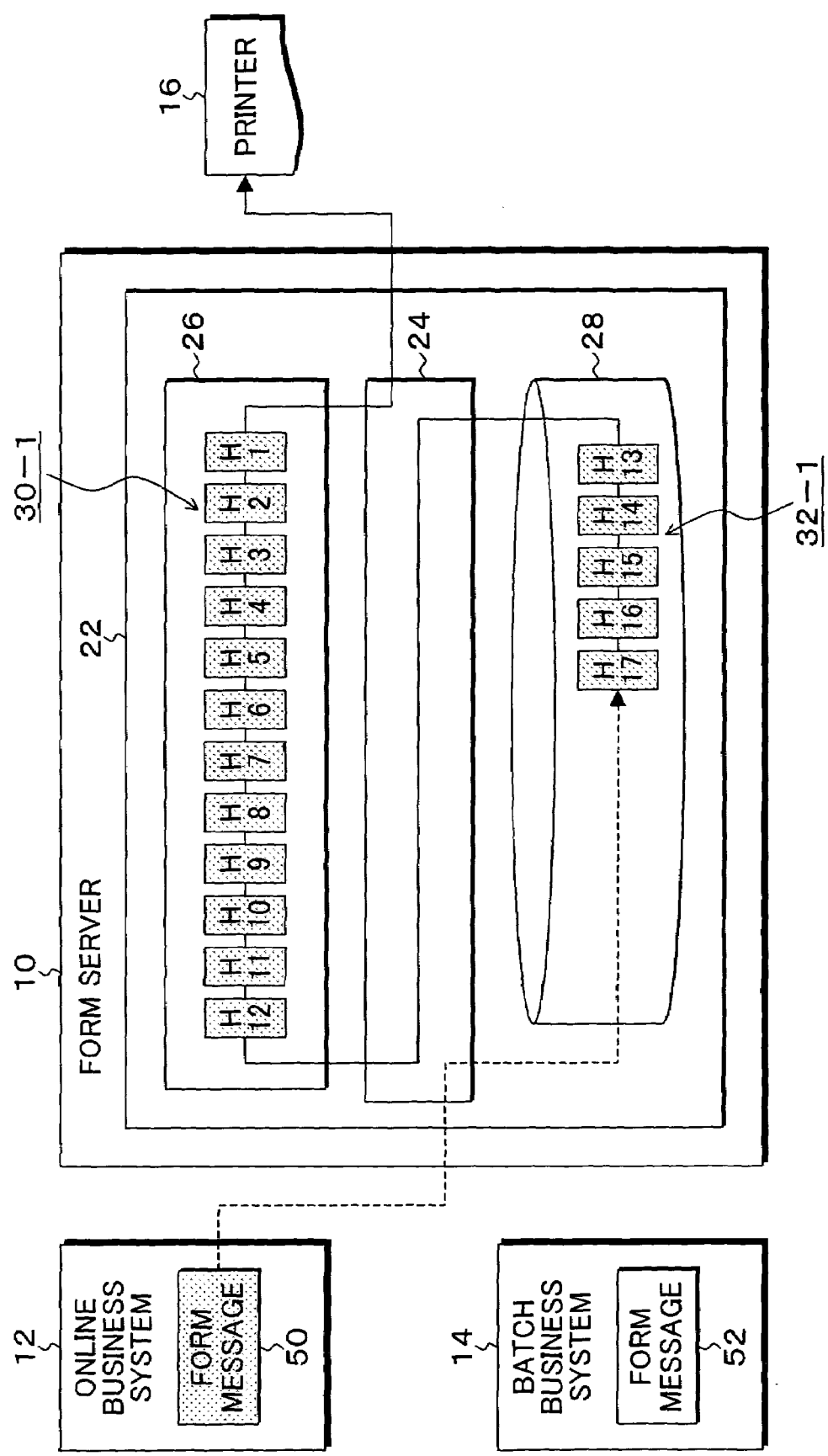
FIG. 8 is an explanatory view of storage processing in the case that the high-speed small-capacity queue is not available.

FIG. 8 is an explanatory view of the storage processing in the case that the high-speed small-capacity medium is not available. In FIG. 8, it is assumed that the high-speed small-capacity queue 30-1 is not available at this time, since the high-priority form messages H1 to H12 are stored. In this case, the high-priority form message 50 output from the online business system 12 will be stored into the low-speed large-capacity queue 32-1 of the disk storage 28.

FIG. 9 is a flowchart of the control processing by the storage control unit 36 of FIG. 1. In the storage control processing of FIG. 9, first, it is checked whether the priority of the form message is high or low. If the form message is the high-priority form message output from the online business system, the procedure proceeds to step S2 to check whether the high-speed small-capacity medium is available or not. If available, the message is stored into the high-speed small-capacity queue in step S3. If not available, the message is stored into the low-speed large-capacity queue in step S4. Then, in step S5, the residence number per unit time is updated. If the message is determined as the low-priority form message from the batch business system in step S1, the procedure proceeds to step S6 to check whether the high-speed small-capacity medium has high availability or not. In this case, for example, 20% is used as a threshold value; 20% or more is determined as high availability; and less than 20% is determined as low availability. If the high-speed small-capacity medium has high availability, the procedure proceeds to step S7 to check whether the residence rate is fast or not. A threshold value of the residence rate is 10 messages/sec, for example. If the residence rate is less than the threshold value of 10 messages/sec and therefore is slow, the message is stored into the high-speed small-capacity queue in step S8. If the residence rate is the threshold value of 10 messages/sec or more and therefore is fast, the message is stored into the low-speed large-capacity queue in step S9.

FIG. 10 is an explanatory view of a control table used for control processing of the dynamic allocation change unit 38 of FIG. 1. The control table used for the dynamic allocation change of FIG. 10 controls transfer of the form messages 58 with two (2) parameters, which are the residence rate 54 of the high-speed small-capacity queue and availability of the high-speed small-capacity medium 56. If the residence rate 54 of the high-speed small-capacity queue is fast, for example, 10 (messages/sec) or more, then in order to make the high-speed small-capacity medium available, the low-priority form messages currently disposed in the high-speed small-capacity queue are transported to the low-speed large-capacity queue. In this case, if the residence rate 54 is fast, but the availability of the high-speed small-capacity medium 56 is sufficient, for example, 20% or more, then the availability of the high-speed small-capacity medium does not have to be ensured any more, and therefore the form messages will not be transferred and transfer will not be performed. Contrary to this, if the availability of the high-speed small-capacity medium 56 is insufficient, for example, less than 20%, then in order to ensure the availability of the high-speed small-capacity medium, the low-priority form messages are taken out from the high-speed small-capacity queue and transported to the low-speed large-capacity queue, as the transfer of the form message 58. On the other hand, in the case that the residence rate 54 of the high-speed small-capacity queue is slow, for example, less than 10 (messages/sec), if the availability of the high-speed small-capacity medium 56 is sufficient, then the high-priority form messages and the low-priority form messages disposed in the low-speed large capacity queue at this time are transferred to the high-speed small-capacity queue in order of the priority. In other words, if the residence rate 54 is slow and the availability of the high-speed small-capacity medium 56 is sufficient, then the form messages are transferred in order of the priority from the low-speed large-capacity queue to the high-speed small-capacity queue. Contrary to this, if the availability of the high-speed small-capacity medium 56 is insufficient, i.e. less than 20%, then the form messages will not be transferred from the low-speed large-capacity queue to the high-speed small-capacity queue.

FIG. 11 is an explanatory view of the location change processing in the case that the residence rate of the high-speed small-capacity queue is fast and the availability of the high-speed small-capacity medium is insufficient. In FIG. 11, the high-priority form messages H1 to H8 and the low-priority form messages L1 to L3 are disposed as pairs in the high-speed small-capacity queue 30-1, and it is assumed that the availability of the high-speed small-capacity medium is less than 20%. In this case, the low-priority form messages L1 to L3 within the high-speed small-capacity queue 30-1 are transferred to the leading part of the low-priority form messages L4 to L7 in the low-speed large-capacity queue 32-1 on the disk storage 28 side. By transferring the low-priority form messages L1 to L3, the availability of the high-speed small-capacity medium is ensured, and the high-priority form messages from the online business system can be stored. The low-priority form messages L1 to L3 disposed in the high-speed small-capacity queue 30-1 are the form messages that have been transferred beforehand when the residence rate of the high-speed small-capacity queue 30-1 was slow and the availability was sufficient.

Figure 12:
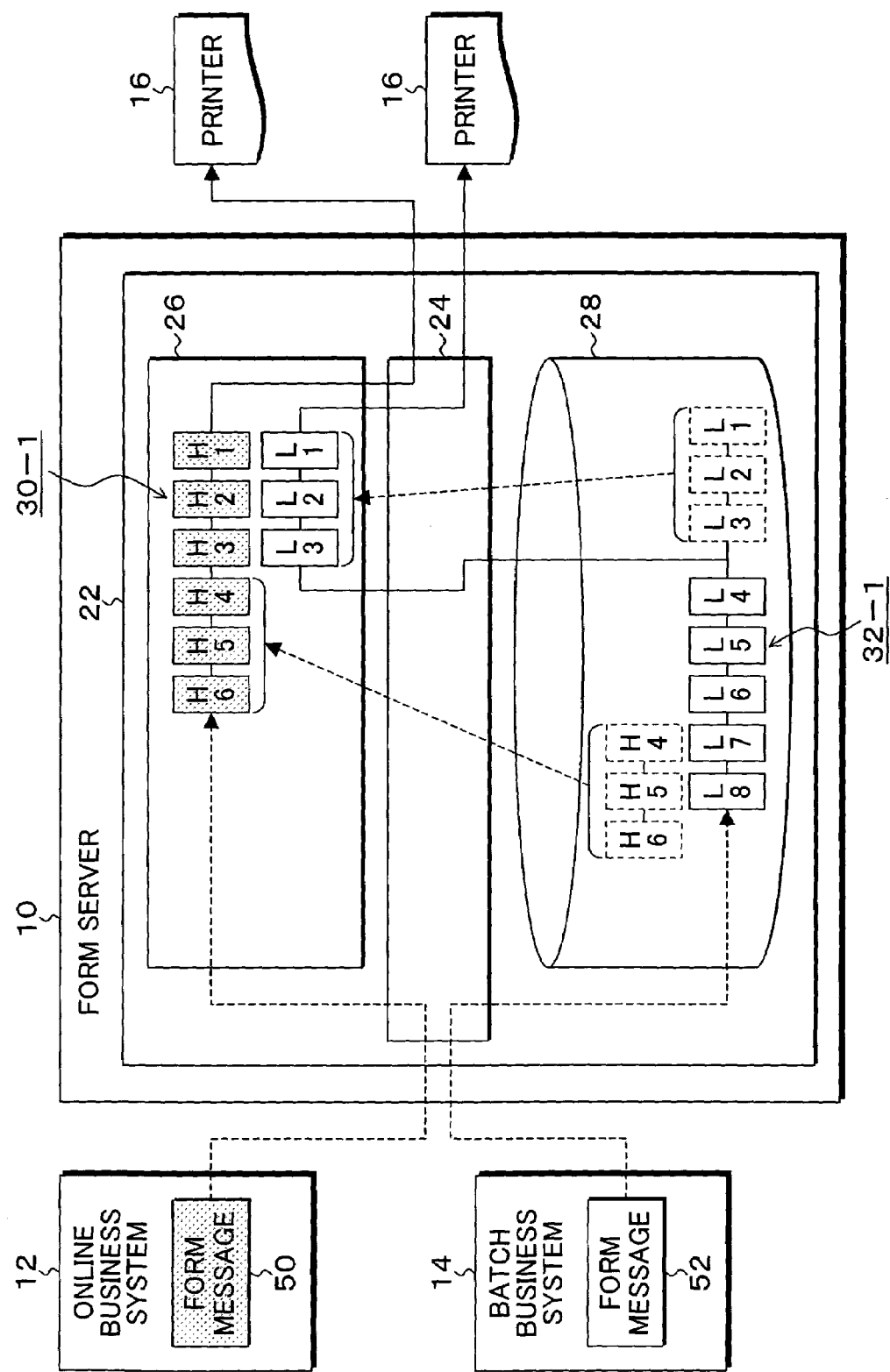
FIG. 12 is an explanatory view of location change processing in the case that the residence rate is slow and the high-speed small-capacity queue has sufficient availability.

FIG. 12 is an explanatory view of the location change processing in the case that the residence rate of the high-speed small-capacity queue is slow and the availability of the high-speed small-capacity medium is sufficient. In FIG. 12, the high-priority form messages H1 to H3 are already disposed in the high-speed small-capacity queue 30-1 and, on the other hand, it is assumed that the high-priority form messages H4 to H6 and the low-priority form messages L1 to L8 are disposed in the low-speed large-capacity queue 32-1. In this situation, if the residence rate of the high-speed small-capacity queue 30-1 is slow and the availability of the high-speed small-capacity medium is sufficient, the high-priority form messages H4 to H6 are sequentially transferred from the low-speed large-capacity queue 32-1 to the high-speed small-capacity queue 30-1, and if the residence rate is still slow and the availability of the high-speed small-capacity medium is sufficient after this transfer, then the low-priority form messages L1 to L8 are continuously transferred to the high-speed small-capacity queue 30-1, and the transfer is halted by, for example, the availability being less than 20% at this point in time.

Figure 13A:
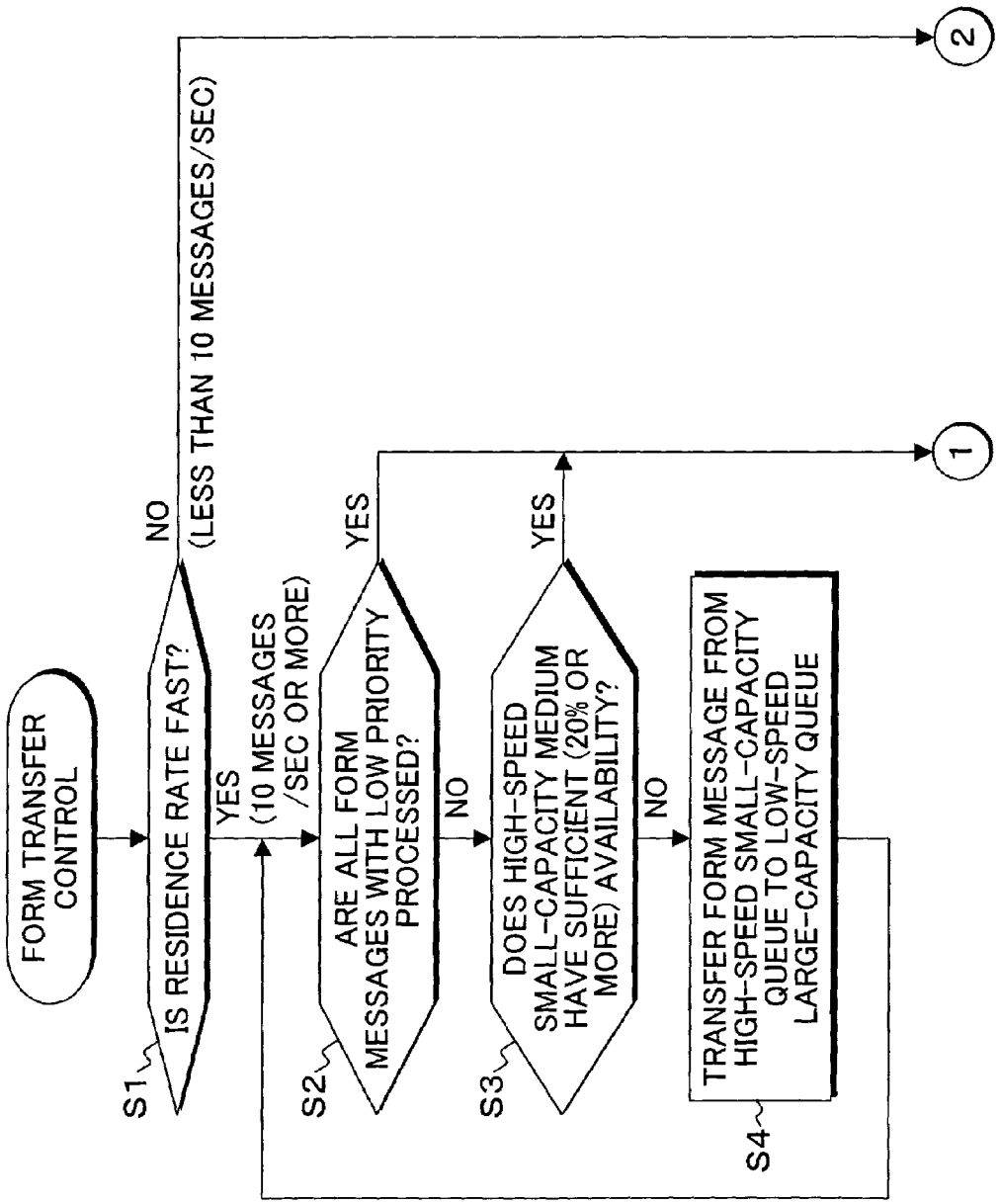
FIGS. 13A and 13B are flowcharts of control processing by the dynamic allocation change unit of FIG. 1.
Figure 13B:
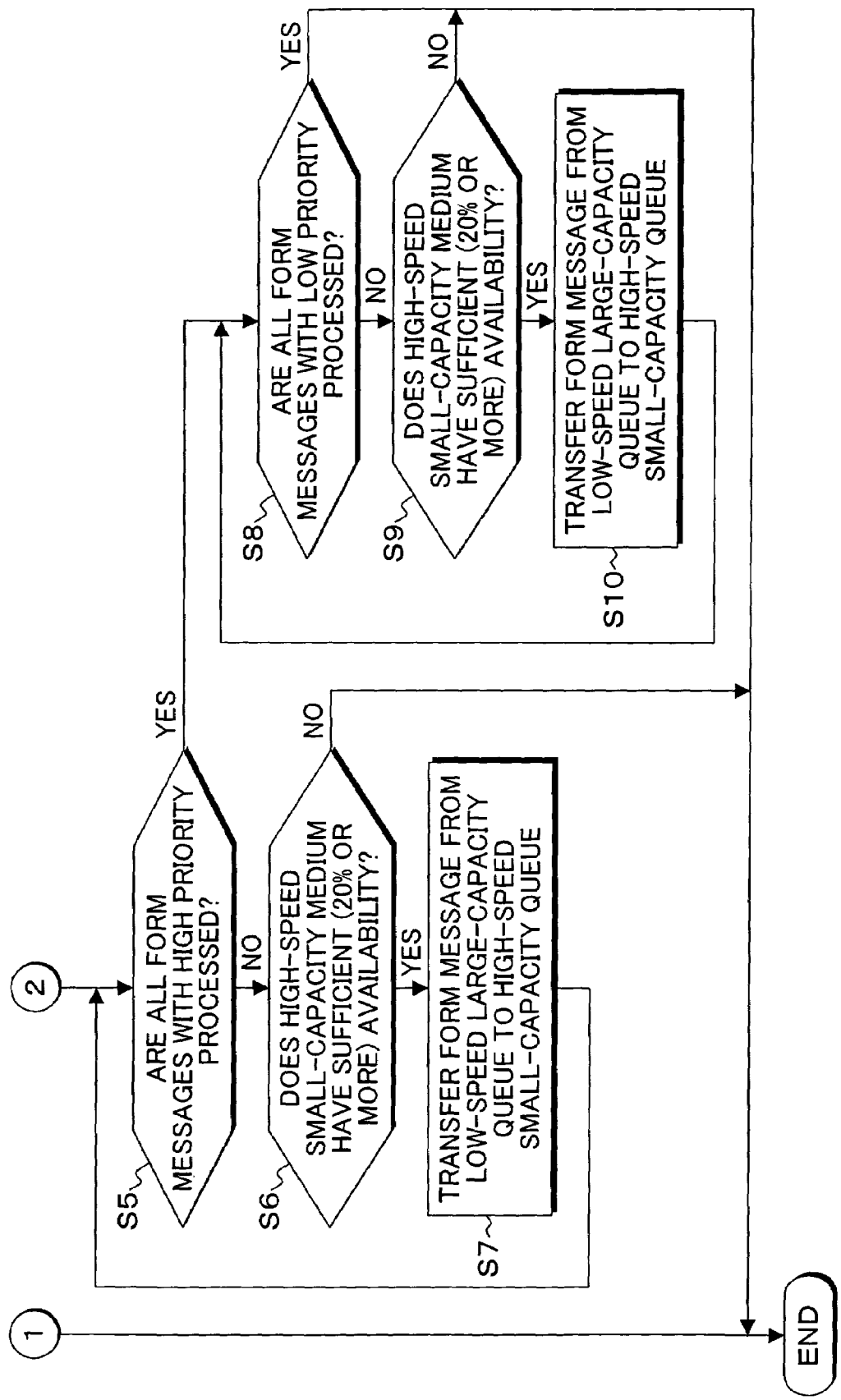

FIGS. 13A and 13B are flowcharts of the control processing by the dynamic allocation change unit 38 of FIG. 1. In FIGS. 13A and 13B, in the form transfer control, it is checked whether the residence rate of the high-speed small-capacity queue is fast or not in step S1. If the residence rate is fast, for example, 10 messages/sec or more, the procedure proceeds to step S2 to check whether all the low-priority form messages disposed in the high-speed small-capacity queue are processed or not; if not processed, the procedure proceeds to step S3 to check whether the availability of the high-speed small-capacity medium is sufficient, for example, 20% or more; and if the availability is insufficient, the low-priority form messages are taken out from the high-speed small-capacity queue and transferred to the low-speed large-capacity queue in step S4. The processing of step S2 to S4 is repeated for all the low-priority form messages existing in the high-speed small-capacity queue, and if the availability of the high-speed small-capacity medium of step 3 becomes 20% or more along the way, the transfer processing is terminated. On the other hand, if the residence rate of the high-speed small-capacity queue is slow, for example, less than 10 messages/sec in step S1, then in step S5 to S7, the transfer processing is performed for the high-priority form messages existing in the low-speed large-capacity queue. In other words, it is checked whether all the high-priority form messages disposed in the low-speed large-capacity queue are processed or not in step S5; if not processed, it is checked whether the availability of the high-speed small-capacity medium is sufficient, i.e. 20% or more, in step S6; and if sufficient, the high-priority form messages are transferred from the low-speed large-capacity queue to the high-speed small-capacity queue in step S7. During the transfer processing for the high-priority form messages, if the availability of the high-speed small-capacity medium becomes less than 20% in step S6, the processing is terminated. On the other hand, all the high-priority form messages have been processed in step S5, the procedure proceeds to step S8 to S10 to perform the transfer processing for the low-priority form messages existing in the low-speed large-capacity queue. In other words, it is checked whether all the low-priority form messages existing in the low-speed large-capacity queue are processed or not in step S8; if not processed, it is checked whether the availability of the high-speed small-capacity medium is sufficient, i.e. 20% or more, in step S9; and if sufficient, the low-priority form messages are transferred from the low-speed large-capacity queue to the high-speed small-capacity queue in step S10. By repeating the processing, if all the low-priority form messages have been processed in step S8 or if the availability of the high-speed small-capacity medium becomes less than 20% in step S9 due to the transfer, the processing is terminated The processing of step S1 to S4 in the flowchart of FIG. 13A corresponds to the location change processing of FIG. 11, and the processing of step S5 to S10 is corresponds to the location change processing of FIG. 12. Also, the present invention provides a program executed by the computer with the hardware environment of FIG. 2 provided in the form management server 10 of FIG. 1, and the program is comprised of the contents of the flowcharts of FIG. 5, FIG. 9 and FIGS. 13A and 13B. The storage control and the dynamic location change of the form messages of FIG. 5 or later are described by way of example of the high-speed small-capacity queue 30-1 and the low-speed large-capacity queue 32-1 which have the output destinations as the printer 16 of FIG. 1, however, for the high-speed small-capacity queues 30-2, 30-3 and the low-speed large-capacity queues 32-2, 32-3 which have other output destinations, i.e. the FAX 18 and the electronic form system 20, as is the case with the printer 16, the determination of the storage location is performed depending on the priority of the form message, the residence rate and the availability of the high-speed small-speed medium, and the dynamic allocation is performed by mutually transferring the messages after the storage. Although, in the above embodiments, 10 messages/sec is shown as the threshold value for determining whether the residence rate is fast or slow, this is only an example and, in the determination whether the residence rate is fast or slow in an actual apparatus, it may be determined that the residence rate is fast when the residence rate is equal to or greater than a transferring rate of the form messages from the high-speed small-capacity medium to the low-speed large-capacity medium and that the residence rate is slow when the residence rate is less than the transferring rate. By such transfer with the determination of the residence rate, it is ensured that the high-speed small-capacity queue can be prevented from becoming unavailable by transferring the messages from the high-speed side to the low-speed side if the residence number of the high-speed small-capacity queue is increased.

The present invention encompasses any modifications without impairing the object and advantages thereof and is not intended to be limited by the numerical values indicated in the above embodiments.

What is claimed is:

1. A computer-readable storage medium which stores a program for outputting a form by apparatus having a high-speed small-capacity queue disposed in a high-speed small-capacity medium inputting and outputting form messages at high speed and a low-speed large-capacity queue disposed in a low-speed large-capacity medium inputting and outputting form messages at a speed slower than the high-speed small-capacity medium, the form output apparatus configured to output form messages with different priorities to a predetermined device after queuing of the form messages, wherein said program allows a computer to execute:

a rate detection step of detecting a residence rate of form messages in the high-speed small-capacity queue;

a storage control step of, when a form message is received, storing the message into the high-speed small-capacity queue or the low-speed large-capacity queue that is determined based on the priority, the availability of the high-speed small-capacity medium and the residence rate;

a dynamic location change step of transferring the form messages between the high-speed small-capacity queue and the low-speed large-capacity queue based on the availability of the high-speed small-capacity medium and the residence rate; and an output control step of outputting the form message to the predetermined device from the high-speed small-capacity queue and/or the low-speed large-capacity queue depending on the priority, wherein the rate detection step includes detecting and recording the residence number of the form messages stored in the high-speed small-capacity queue at predetermined time intervals to detect the residence rate from a difference between the residence numbers at a start time and an end time of a certain recording period, wherein the rate detection step includes, if the maximum value and the minimum value exist outside of the range between the residence numbers at the start time and the end time within the certain recording period, adding an absolute value of the difference between the maximum value and the minimum value to the residence rate.

2. The storage medium according to claim 1, wherein the storage control step comprises:

a first storage control step of, when a high-priority form message is received, storing the message into the high-speed small-capacity queue if the high-speed small-capacity medium is available and storing the message into the low-speed large-capacity queue if the high-speed small-capacity medium is not available; and a second storage control step of, when a low-priority form message is received, storing the message into the high-speed small-capacity queue if the availability of the high-speed small-capacity medium is sufficient, storing the message into the low-speed large-capacity queue if the residence rate is fast, and storing the message into the low-speed large-capacity queue if the availability of the high-speed small-capacity medium is insufficient.

3. The storage medium according to claim 1, wherein the dynamic location change step includes:

periodically determining the residence rate of the high-speed small-capacity queue;

if the residence rate is fast, transferring the low-priority form messages from the high-speed small-capacity queue to the low-speed large-capacity queue when the availability of the high-speed small-capacity medium is insufficient; and if the residence rate is slow, transferring the high-priority and low-priority form messages from the low-speed large-capacity queue to the high-speed small-capacity queue when the availability of the high-speed small-capacity medium is sufficient.

4. The storage medium according to claim 3, wherein the dynamic location change step includes, when the residence rate is slow and the availability of the high-speed small-capacity medium is sufficient, transferring the low-priority messages from the low-speed large-capacity queue to the high-speed small-capacity queue after transferring the high-priority messages from the low-speed large-capacity queue to the high-speed small-capacity queue.

5. The storage medium according to claim 1, wherein the set of the high-speed small-capacity queue and the low-speed large-capacity queue is constructed for each device which is an output destination of form messages.

6. The storage medium according to claim 2, wherein the second storage control step includes determining that the availability is sufficient if the available capacity of the high-speed small-capacity medium is equal to or more than a threshold value and that the availability is insufficient if less than the threshold value.

7. The storage medium according to claim 6, wherein the threshold value of the available capacity is at least 20 percent.

8. The storage medium according to claim 2, the second storage control step includes determining that a rate is fast if the rate is equal to or greater than a transferring rate of the form messages from the high-speed small-capacity medium to the low-speed large-capacity medium and that a rate is slow if the rate is less than the transferring rate.

9. A form output method having a high-speed small-capacity queue disposed in a high-speed small-capacity medium inputting and outputting form messages at high speed and a low-speed large-capacity queue disposed in a low-speed large-capacity medium inputting and outputting form messages at a speed slower than the high-speed small-capacity medium, to output form messages with different priorities to a predetermined device after queuing of the form messages, the method comprising:

a rate detection step of detecting a residence rate of form messages in the high-speed small-capacity queue;

a storage control step of, when the form message is received, storing the message into the high-speed small-capacity queue or the low-speed large-capacity queue that is determined based on the priority, the availability of the high-speed small-capacity medium and the residence rate;

a dynamic location change step of transferring the form messages between the high-speed small-capacity queue and the low-speed large-capacity queue based on the availability of the high-speed small-capacity medium and the residence rate; and an output control step of outputting the form message to the predetermined device from the high-speed small-capacity queue and/or the low-speed large-capacity queue depending on the priority, wherein the rate detection step includes detecting and recording a residence number of the form messages stored in the high-speed small-capacity queue at predetermined time intervals to detect the residence rate from a difference between the residence numbers at a start time and an end time of a certain recording period, wherein the rate detection step includes, if the maximum value and the minimum value exist outside of the range between the residence numbers at the start time and the end time within the certain recording period, adding an absolute value of the difference between the maximum value and the minimum value to the residence rate.

10. The method according to claim 9, wherein the storage control step comprises:

a first storage control step of, when a high-priority form message is received, storing the message into the high-speed small-capacity queue if the high-speed small-capacity medium is available and storing the message into the low-speed large-capacity queue if the high-speed small-capacity medium is not available; and a second storage control step of, when a low-priority form message is received, in case the availability of the high-speed small-capacity medium is sufficient, storing the message into the high-speed small-capacity queue if the residence rate is slow, whereas storing the message into the low-speed large-capacity queue if the residence rate is fast, and in case the availability of the high-speed small-capacity medium is insufficient, storing the message into the low-speed large-capacity queue.

11. The method according to claim 9, wherein the dynamic location change step includes periodically determining the residence rate of the high-speed small-capacity queue;

if the residence rate is fast, transferring the low-priority form messages from the high-speed small-capacity queue to the low-speed large-capacity queue when the availability of the high-speed small-capacity medium is insufficient; and if the residence rate is slow, transferring the high-priority and low-priority messages from the low-speed large-capacity queue to the high-speed small-capacity queue when the availability of the high-speed small-capacity medium is sufficient.

12. The method according to claim 11, wherein the dynamic location change step includes, when the residence rate is slow and the availability of the high-speed small-capacity medium is sufficient, transferring the low-priority messages from the low-speed large-capacity queue to the high-speed small-capacity queue after transferring the high-priority messages from the low-speed large-capacity queue to the high-speed small-capacity queue.

13. A form output apparatus configured to output form messages with different priorities to a predetermined device after queuing of the form messages, the apparatus comprising:

a high-speed small-capacity queue disposed in a high-speed small-capacity medium inputting and outputting form messages at high speed;

a low-speed large-capacity queue disposed in a low-speed large-capacity medium inputting and outputting form messages at a speed slower than the high-speed small-capacity medium;

a rate detection unit detecting a residence rate of form messages in the high-speed small-capacity queue;

a storage control unit, when a form message is received, storing the message into the high-speed small-capacity queue or the low-speed large-capacity queue that is determined based on the priority, the availability of the high-speed small-capacity medium and the residence rate;

a dynamic location change unit transferring the form messages between the high-speed small-capacity queue and the low-speed large-capacity queue based on the availability of the high-speed small-capacity medium and the residence rate; and an output control unit outputting the form message to the predetermined device from the high-speed small-capacity queue and/or the low-speed large-capacity queue depending on the priority, wherein the rate detection unit detects and records a residence number of the form messages stored in the high-speed small-capacity queue at predetermined time intervals to detect the residence rate from a difference between the residence numbers at a start time and an end time of a certain recording period, wherein the rate detection unit includes, if the maximum value and the minimum value exist outside of the range between the residence numbers at the start time and the end time within the certain recording period, adding an absolute value of the difference between the maximum value and the minimum value to the residence rate.

14. The apparatus according to claim 13, wherein the storage control unit comprises:

a first storage control unit, when a high-priority form message is received, storing the message into the high-speed small-capacity queue if the high-speed small-capacity medium is available and storing the message into the low-speed large-capacity queue if the high-speed small-capacity medium is not available; and a second storage control unit, when a low-priority form message is received, in case the availability of the high-speed small-capacity medium is sufficient, storing the message into the high-speed small-capacity queue if the residence rate is slow, whereas storing the message into the low-speed large-capacity queue if the residence rate is fast, the second storage control unit storing the message into the low-speed large-capacity queue in case the availability of the high-speed small-capacity medium is insufficient.

15. The apparatus according to claim 13, wherein the dynamic location change unit periodically determines the residence rate of the high-speed small-capacity queue, wherein if the residence rate is fast, the dynamic location change unit transfers the low-priority form messages from the high-speed small-capacity queue to the low-speed large-capacity queue when the availability of the high-speed small-capacity medium is insufficient, and wherein if the residence rate is slow, the dynamic location change unit transfers the high-priority and low-priority messages from the low-speed large-capacity queue to the high-speed small-capacity queue when the availability of the high-speed small-capacity medium is sufficient.

16. The form output apparatus of claim 15, wherein when the residence rate is slow and the availability of the high-speed small-capacity medium is sufficient, the dynamic location change unit transfers the low-priority messages from the low-speed large-capacity queue to the high-speed small-capacity queue after transferring the high-priority messages from the low-speed large-capacity queue to the high-speed small-capacity queue.

\* \* \* \* \*